United States Patent
Lyssy (10) Patent No.: US 11,442,190 B2
(45) Date of Patent: Sep. 13, 2022

(54) AUTONOMOUS MARINE SURVEY NODES

(71) Applicant: PGS Geophysical AS, Oslo (NO)

(72) Inventor: Matthew Eric Lyssy, Houston, TX (US)

(73) Assignee: PGS Geophysical AS, Oslo (NO)

( * ) Notice: Subject to any disclaimer, the term of this patent is extended or adjusted under 35 U.S.C. 154(b) by 411 days.

(21) Appl. No.: 16/385,800

(22) Filed: Apr. 16, 2019

(65) Prior Publication Data

US 2019/0317236 A1    Oct. 17, 2019

Related U.S. Application Data

(60) Provisional application No. 62/658,163, filed on Apr. 16, 2018.

(51) Int. Cl.
  *G01V 1/38*    (2006.01)
(52) U.S. Cl.
  CPC .......... *G01V 1/3835* (2013.01); *G01V 1/3808* (2013.01); *G01V 1/3843* (2013.01)
(58) Field of Classification Search
  CPC .. G01V 1/3835; G01V 1/3808; G01V 1/3843; B64C 39/02; B64C 37/00
  See application file for complete search history.

(56) References Cited

U.S. PATENT DOCUMENTS

| | | | |
|---|---|---|---|
| 5,947,051 A | 9/1999 | Geiger | |
| 6,975,560 B2 | 12/2005 | Berg et al. | |
| 7,210,556 B2 | 5/2007 | Bath et al. | |
| 7,632,043 B2 | 12/2009 | Thompson et al. | |
| 8,492,692 B2 | 7/2013 | Fisher | |
| 8,500,060 B2 | 8/2013 | Grip | |
| 8,717,844 B2 | 5/2014 | Welker et al. | |
| 9,010,678 B1 | 4/2015 | Hiller | |
| 9,056,679 B1 | 6/2015 | Langston | |
| 9,090,319 B2 | 7/2015 | Brizard et al. | |
| 9,096,106 B2 | 8/2015 | Hanson et al. | |
| 9,360,575 B2 | 6/2016 | Etienne et al. | |
| 9,448,311 B2 | 9/2016 | Maxwell | |
| 9,580,172 B2 | 2/2017 | Hobart et al. | |
| 9,753,169 B2 | 9/2017 | Jewell | |
| 9,841,522 B2 | 12/2017 | Fyffe et al. | |

(Continued)

FOREIGN PATENT DOCUMENTS

EP    3364515    8/2018

OTHER PUBLICATIONS

Siddall, et al., "Wind and water tunnel testing of a morphing aquatic micro air vehicle"; Interface Focus, Royal Society Publishing, Published Dec. 16, 2016 (15 pgs) Retrieved from http://rsfs.royalsocietypublishing.org/content/7/1/20160085.

(Continued)

*Primary Examiner* — Ian J Lobo (57) ABSTRACT

An example autonomous marine survey node can include a circuitry component including circuitry of a marine survey receiver, a ballast tank coupled to the circuitry component, and a maneuvering system coupled to the circuitry component. The ballast tank can be configured to adjust a buoyancy of the autonomous marine survey node. The maneuvering system can be configured to autonomously perform aerial maneuvers and autonomously perform submersed maneuvers near an underwater surface.

14 Claims, 8 Drawing Sheets

(56) References Cited

U.S. PATENT DOCUMENTS

| | | | |
|---|---|---|---|
| 9,845,137 | B2 | 12/2017 | Lelaurin et al. |
| 9,873,494 | B2 | 1/2018 | Jewell |
| 9,891,333 | B2 | 2/2018 | Valsvik et al. |
| 10,005,523 | B2 * | 6/2018 | Dudley ................... B63B 21/08 |
| 10,543,892 | B2 * | 1/2020 | Postic ................... G01V 1/3808 |
| 10,669,024 | B2 * | 6/2020 | Wang ..................... B64C 39/024 |
| 10,670,759 | B2 | 6/2020 | Eick et al. |
| 2011/0217123 | A1 | 9/2011 | Jewell et al. |
| 2011/0226174 | A1 | 9/2011 | Parks |
| 2014/0301161 | A1 | 10/2014 | Brizard et al. |
| 2015/0367938 | A1 | 12/2015 | Zambrano et al. |
| 2016/0031275 | A1 | 2/2016 | Monroe et al. |
| 2016/0376000 | A1 | 12/2016 | Kohstall |
| 2017/0137098 | A1 * | 5/2017 | Valsvik ................ G01V 1/3852 |
| 2017/0190421 | A1 | 7/2017 | Diez-Garias et al. |
| 2017/0242144 | A1 | 8/2017 | Brizard |
| 2017/0343691 | A1 | 11/2017 | Cespedes |
| 2018/0003836 | A1 | 1/2018 | Morris et al. |
| 2018/0164456 | A1 | 6/2018 | Chalenski |

OTHER PUBLICATIONS

Wang, et al., "Submersible unmanned aerial vehicle: configuration design and analysis based on computational fluid dynamics"; MATEC Web of Conferences, vol. 95, p. 07023, EDP Sciences, Published Dec. 31, 2017 (6 pgs) Retrieved from https://www.matec-conferences.org/articles/matecconf/pdf/2017/09/matecconf_icmme2017_07023.pdf.

Berger, et al., "An Ocean Bottom Seismic Observatory with Near Real-Time Telemetry," Earth and Space Science, vol. 3, pp. 68-77 (AGU Publications Feb. 5, 2016).

Pai, "Autonomous Vehicles Benefit from 3-D Seismic Arrays," https://www.hartenergy.com/ep/exclusives/autonomous-Vehicles-benefit-3-d-seismic-arrays-176648 (Hart Energy Sep. 5, 2017).

Researchers at the Johns, "New UAV Can Launch from Underwater for Aerial Missions," https://www.jhuapl.edu/PressRelease/160317 (Johns Hopkins University Mar. 17, 2016).

* cited by examiner

AUTONOMOUS MARINE SURVEY NODES

CROSS-REFERENCE TO RELATED APPLICATIONS

This application claims priority to U.S. Provisional Application 62/658,163, filed Apr. 16, 2018, which is incorporated by reference as if entirely set forth herein.

BACKGROUND

In the past few decades, the petroleum industry has invested heavily in the development of marine survey techniques that yield knowledge of subterranean formations beneath a body of water in order to find and extract valuable resources, such as oil. High-resolution images of a subsurface formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers may be located on or near the seafloor, on one or more streamers towed by the marine survey vessel, or on one or more streamers towed by another vessel. The marine survey vessel typically contains marine survey equipment, such as navigation control, source control, marine survey receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the source.

DETAILED DESCRIPTION

The present disclosure is related to autonomous marine survey nodes. In some previous approaches to deployment of marine survey nodes, marine survey nodes may be deployed manually. Manual deployment of marine survey nodes may be expensive and consume resources, such as time and fuel, to position on an underwater surface, such as the seafloor. A surface vessel, from which marine survey nodes may be deployed, may travel long distances on the water surface to get the marine survey nodes to their respective destinations on the underwater surface. In some previous approaches, a marine survey node may be tethered, at least temporarily, to a surface vessel during deployment of the marine survey node. Thus, a surface vessel may be positioned near or directly above the destination of a marine survey node on the underwater surface and not move from that position until the marine survey node is deployed onto the underwater surface. Because a marine survey node array can span hundreds or thousands of meters on the underwater surface, it may take several hours or days to manually deploy marine survey nodes from a surface vessel to form a marine survey node array on the underwater surface.

In contrast, at least one embodiment of the present disclosure includes autonomous deployment and retrieval of marine survey nodes via autonomous marine survey nodes. As used herein, "autonomous" modifying a verb refers to performing an action described by the verb with limited or no human interaction or decision making. An example of limited human interaction or decision making can be programing a submarine to perform one or more actions but the submarine performs the one or more actions without any further human interaction or decision making. As used herein, "autonomous" modifying a noun refers to an ability of an object described by the noun to perform one or more actions with limited or no human interaction or decision making.

Autonomous marine survey nodes can autonomously maneuver through the air and water from a surface vessel to an underwater surface and from an underwater surface to a surface vessel. Autonomous deployment can occur without tethering a marine survey node to a surface vessel or positioning a surface vessel directly above a destination of each respective marine survey node on the underwater surface to form a marine survey node array. Multiple autonomous marine survey nodes can be deployed from a single location. At least one embodiment includes a plurality of autonomous marine survey nodes. The autonomous marine survey nodes can be deployed from a surface vessel via aerial flights. The autonomous marine survey nodes can fly and then submerge. The autonomous marine survey nodes can maneuver to an underwater surface. The autonomous marine survey nodes can anchor themselves to the underwater surface to form a marine survey node array. The marine survey node array can collect marine survey data. After collecting marine survey data, the autonomous marine survey nodes can detach from the underwater surface and maneuver to the water surface. The autonomous marine survey nodes can be retrieved by the same surface vessel from which the autonomous marine survey nodes were deployed or a different surface vessel via aerial flights of the autonomous marine survey nodes.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, reference numeral 240 may reference element "40" in FIG. 2, and a similar element may be referenced as 340 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
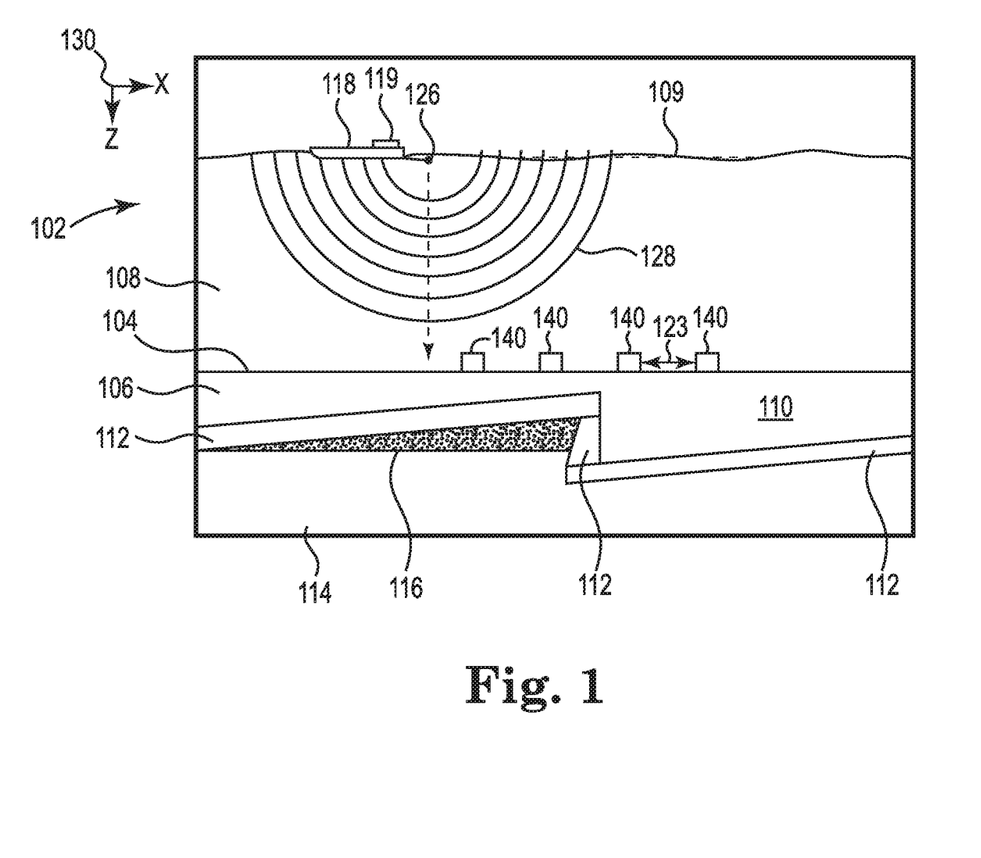
FIG. 1 is an elevation or xz-plane view of marine surveying in which signals are emitted by a source for recording by marine survey receivers.

FIG. 1 illustrates an elevation or xz-plane 130 view of marine surveying in which signals are emitted by a source 126, such as a non-impulsive source, for recording by autonomous marine survey nodes 140. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the underwater surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. The marine survey vessel 118 can tow one or more sources 126 that produce signals as the marine survey vessel 118 moves across the water surface 109. Although not specifically illustrated, the sources 126 can include at least one marine impulsive source, at least one marine non-impulsive source, or a combination of at least one marine impulsive source and at least one marine non-impulsive source. The sources 126 may also be towed by other vessels or may be otherwise disposed in fluid volume 108. Although illustrated as a point, the source 126 can represent a source string or a source array. The marine survey vessel 118 can include a controller 119. For example, the controller 119 can be coupled to the source 126 and configured to control the source 126. The marine survey vessel 118 can include sensing electronics and data-processing facilities that allow marine survey receiver readings to be correlated with locations on the water surface and absolute three-dimensional positions with respect to a three-dimensional coordinate system. As used herein, "location" refers to an absolute place, such as may be quantified by earth coordinates, map coordinates, or latitude and longitude, while "position" refers to a place relative to another place or object. For example, a location may be given by GPS coordinates, while a position may be given by a distance and heading from another place or object.

Although not specifically illustrated, the marine survey receivers may be located on ocean bottom cables or marine survey nodes fixed at or near the underwater surface 104. For example, the marine survey receivers can be a component of marine survey nodes, such as the autonomous marine survey nodes 140, each of which include a marine survey receiver. The marine survey receiver can include a pair of sensors including a geophone that detects particle displacement within the water by detecting particle motion variation, such as velocities or accelerations, and/or a receiver, such as a hydrophone, that detects variations in pressure. As described herein, the autonomous marine survey nodes 140 can arrange themselves on the underwater surface 104 so as to form a marine survey node array. Characteristics of a marine survey node array can include a quantity of rows of autonomous marine survey nodes, a geometry of the marine survey node array (for example, rectangular comprising a plurality of rows and columns of the autonomous marine survey nodes 140), a quantity of columns of autonomous marine survey nodes, spacing between the columns and rows of the marine survey node array, and a desired location of the marine survey node array (for example, desired locations for each of the autonomous marine survey nodes 140 on the underwater surface 104).

It can be beneficial to have the marine survey nodes of a marine survey node array to have a set spacing 123 therebetween so as to have a predictable arrangement. Having more information about the location of a marine survey node can increase the accuracy an image of a subsurface formation generated from marine survey data collected by the autonomous marine survey nodes 140. As described herein, at least one embodiment of the present disclosure enables autonomous marine survey nodes 140 to be deployed precisely on the underwater surface 104 so that more information about the locations of the autonomous marine survey nodes 140 is known. Thus, at least one embodiment provides a more accurate image of a subsurface formation than previous approaches. Although FIG. 1 illustrates the spacing 123 between the autonomous marine survey nodes 140 in the x-direction, in at least one embodiment the autonomous marine survey nodes 140 can have a set spacing in the y-direction or in both the x- and y-directions. As described herein, at least one embodiment of the present disclosure provides more precise and accurate deployment of the autonomous marine survey nodes 140 onto the underwater surface 104 such that one or more characteristics of a marine survey node array, such as a spacing of the autonomous marine survey nodes 140 of the marine survey node array, are well-defined.

FIG. 1 shows acoustic energy illustrated as an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the underwater surface 104, and the autonomous marine survey nodes 140 deployed onto the underwater surface 104, at which point the outward and downward expanding down-going wavefield 128 may partially scatter, may partially reflect back toward the autonomous marine survey nodes 140, and may partially refract downward into the subsurface volume 106, becoming elastic signals within the subsurface volume 106.

Figure 2A:
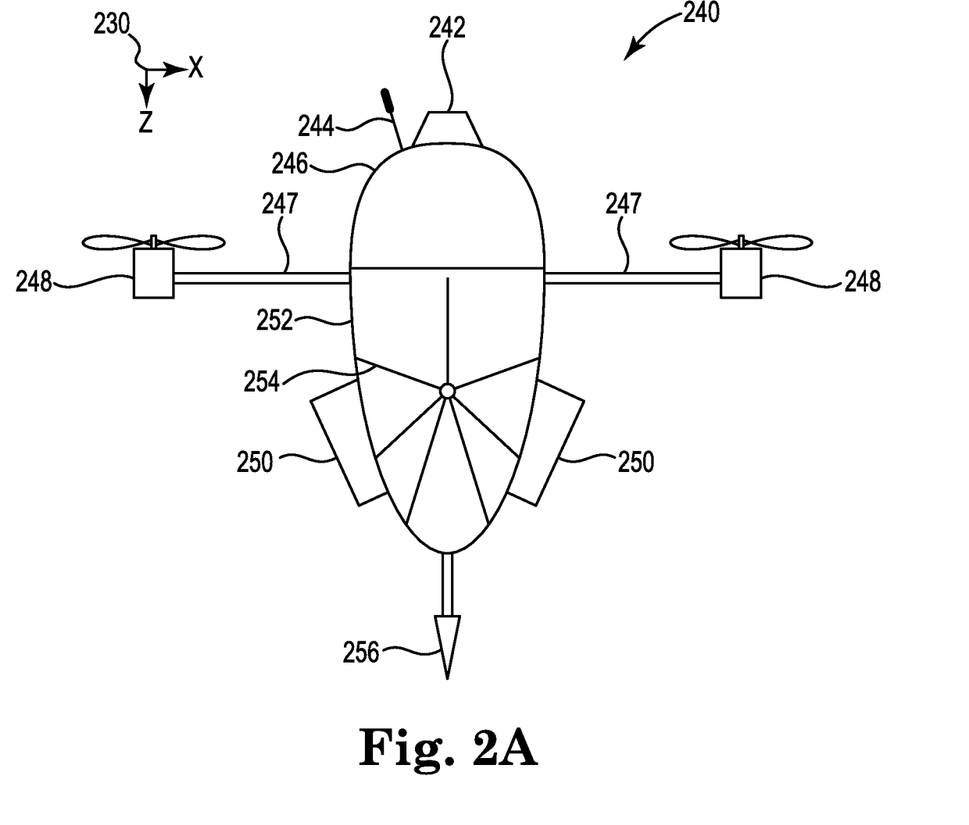
FIG. 2A is an elevation or xz-plane view of an exemplary embodiment of an autonomous marine survey node.
Figure 2B:
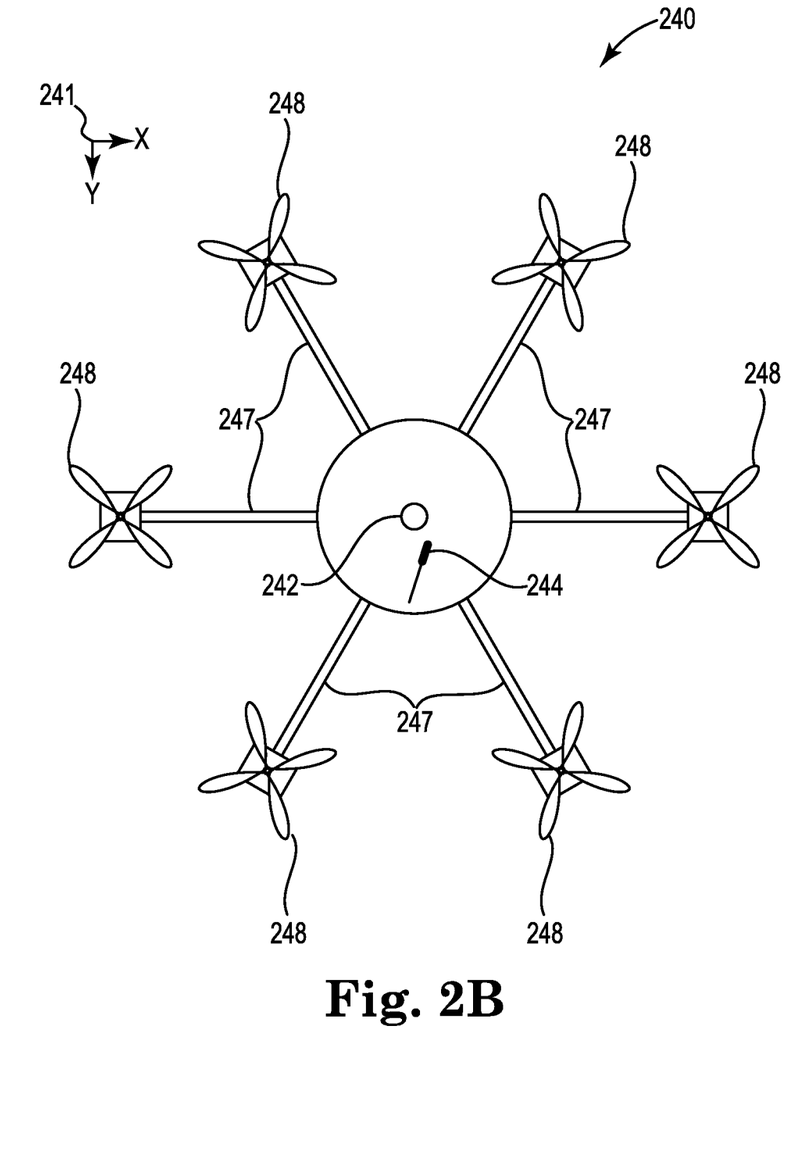
FIG. 2B is a plan or xy-plane view of the exemplary embodiment of an autonomous marine survey node shown in FIG. 2A.

FIG. 2A is an elevation or xz-plane 230 view of an exemplary embodiment of an autonomous marine survey node 240. FIG. 2B illustrates a plan or xy-plane 241 view of the autonomous marine survey node 240. The autonomous marine survey node 240 can include a circuitry component 246. The circuitry component 246 can be included within a watertight housing. The circuitry component 246 can include circuitry of a marine survey receiver (for example, a seismic receiver, electromagnetic (EM) receiver, etc.). The circuitry component 246 can include control circuitry. The circuitry component 246 can include a storage system including a memory for storage of instructions and marine survey data collected by the marine survey node 240. The storage system can include a wired interface, a wireless interface, or both a wired and a wireless interface for downloading collected marine survey data and diagnostic data from the autonomous marine survey node 240 and transferring instructions to the marine survey node 240.

The circuitry component 246 can include a communication transceiver for communication between autonomous marine survey nodes 240. Non-limiting examples of a communication transceiver include an EM transceiver, a frequency modulation (FM) transceiver, an amplitude modulation (AM) transceiver, and an infrared (IR) transceiver. As used herein, "transceiver" can include a transmitter, a receiver, or both a transmitter and a receiver, unless the content clearly dictates otherwise. As described herein, the autonomous marine survey node 240 can include a GPS receiver 244 and an acoustic transceiver 242 for determining a location of the autonomous marine survey node 240 when in flight and a relative position of the autonomous marine survey node 240 when submerged. The autonomous marine survey node 240 can utilize the EM transceiver of the circuitry component 246 to transmit a location or relative position of the autonomous marine survey node 240 to other autonomous marine survey nodes 240 and to surface vessels. The autonomous marine survey node 240 can utilize the EM transceiver of the circuitry component 246 to receive a location or relative position of other autonomous marine survey nodes 240 and surface vessels.

The circuitry component 246 can be coupled to a ballast tank 252. The ballast tank 252 can be configured to adjust a buoyancy of the autonomous marine survey node 240. The ballast tank 252 can include a container for compressed air, for example, for forcing water out of the ballast tank 252. The ballast tank 252 can include a plurality of structural support members 254. The structural support members 254 can provide support to facilitate an operating depth of the autonomous marine survey node 240 of at least three thousand meters. The structural support members 254 can be coupled to the exterior, interior, or both the exterior and interior of the container. The structural support members 254 can be coupled to the container in a deflected or compressed state so that the structural support members 254 resist and counteract hydrostatic pressure on the exterior of the container when the autonomous marine survey node 240 is submerged.

The autonomous marine survey node 240 can include a maneuvering system. The maneuvering system of the autonomous marine survey node 240 can be configured to operate in an aerial environment and a submerged environment. Thus, the autonomous marine survey node 240 can perform aerial maneuvers as well as submerged maneuvers. The autonomous marine survey node 240 can transition between an aerial environment and a submerged environment. As illustrated in FIGS. 2A-2B, the maneuvering system can include a plurality of rotors 248. Note that FIG. 2A omits some of the rotors 248 that would be viewable in the xz-plane 230 view of the autonomous marine survey node 240 so as to not obscure the view of other components of the autonomous marine survey node 240. The rotors 248 can be coupled to the ballast tank 252, the circuitry component 246, or a combination thereof via a plurality of supports 247. The autonomous marine survey node 240 can be configured to use the rotors 248 to perform aerial maneuvers and submerged maneuvers. Although FIG. 2B illustrates six rotors 248 approximately equally spaced in a hexagonal arrangement, embodiments of the present disclosure are not so limited. For example, the maneuvering system can include fewer or greater than six rotors 248 with regular or irregular spacing therebetween. Although FIGS. 2A-2B illustrate the rotors 248 each including two blades, embodiments of the present disclosure are not so limited. For example, at least one of the rotors 248 can include fewer or greater than two blades. Each of the rotors 248 can include a watertight housing for operation while the autonomous marine survey node 240 is submerged. The blades of the rotors 248 can comprise a material capable of withstanding the additional forces that act upon the blades when the autonomous marine survey node 240 is submerged as compared to when the autonomous marine survey node 240 is in flight. The rotors 248 can be configured to provide more or less power to the blades when the autonomous marine survey node 240 is submerged than when the autonomous marine survey node 240 is in flight. The rotors 248 can rotate at a speed that is most appropriate for the environment. For example, the rotors 248 can rotate at a higher speed for aerial maneuvers, and at a lower when submerged.

The maneuvering system of the autonomous marine survey node 240 can transition between a first operating mode for performing aerial maneuvers and a second operating mode for performing submerged maneuvers. In at least one embodiment of the present disclosure, the rotors 248 can be configured to operate in a first orientation in the first operating mode and a second orientation the second operating mode. For example, in the first operating mode, the rotors 248 can be oriented such that the blades of the rotors 248 rotate in a plane substantially parallel to the xy-plane 241. Although not specifically illustrated, in the second operating mode, the rotors 248 can be oriented such that the blades of the rotors 248 rotate in planes substantially parallel to the xz-plane 230.

In at least one embodiment of the present disclosure, each of the rotors 248 can be controlled independently so that one of the rotors 248 operates a first speed and a different one of the rotors 248 operates at a second speed. The trajectory of the autonomous marine survey node 240 can be altered by controlling the rotors 248 independently, causing the autonomous marine survey node 240 to pitch, roll, yaw, and combinations thereof.

The maneuvering system of the autonomous marine survey node 240 can be configured to provide the autonomous marine survey node 240 with an operating depth of at least three thousand meters. For example, the maneuvering system can include thrusters for hovering at a location above an underwater surface and resisting underwater currents. The maneuvering system can include hydroplanes 250, a rudder (not shown), or both to direct movement of the autonomous marine survey node 240 while submerged. The hydroplanes 250 may also be referred to as steering fins.

The autonomous marine survey node 240 can be lightweight for performing aerial maneuvers but have sufficient structural strength to withstand the extreme hydrostatic pressure near an underwater surface (for example, the seafloor at depths to three thousand meters). In at least one embodiment of the present disclosure, the ballast tank 252 can comprise a composite material. As used herein a composite material is a material made from two or more constituent materials with different physical or chemical properties that, when combined, produce a material with characteristics different from the individual components. The composite materials referred to herein are characterized by low weight, high strength fibers with high stiffness or modulus of elasticity compared to other materials that are bound together by weaker matrices. Composite materials as used herein, may be referred to in the literature as "advanced composite materials." A non-limiting example of a composite material is a carbon fiber material. The composite material provides strength for when the autonomous marine survey node 240 is submerged without making the autonomous marine survey node 240 unduly heavy for aerial maneuvers. The supports 247 and the structural support members 254 can each be formed of a same or different material as the ballast tank 252.

The autonomous marine survey node 240 can include an anchoring system 256 configured to secure the autonomous marine survey node 240 to an underwater surface. The anchoring system 256 can include a stationary spike configured to be driven into an underwater surface by motion of the autonomous marine survey node 240. The rotors 248 can spin to urge the autonomous marine survey node 240 toward a water surface. The anchoring system 256 can include a spike configured move relative to the autonomous marine survey node 240 (for example, extend and retract) to secure the autonomous marine survey node 240 to an underwater surface. Although FIG. 2A illustrates the anchoring system 256 as a spike coupled to the ballast tank 252, embodiments of the present disclosure are not so limited. In at least one embodiment of the present disclosure, the anchoring system 256 can be configured to release the autonomous marine survey node 240 from the underwater surface in response to a storage system of the marine survey node 240 reaching a threshold capacity. For example, after collecting a set (user-determined) amount of marine survey data, the autonomous marine survey node 240 can release from an underwater surface to ascend to a water surface. In at least one embodiment of the present disclosure, the anchoring system 256 can be configured to release the autonomous marine survey node 240 from the underwater surface in response to marine survey data collection in a region surrounding the autonomous marine survey node 240 being completed. In at least one embodiment of the present disclosure, the anchoring system 256 can be configured to release the autonomous marine survey node 240 from the underwater surface in response to a power level of a power supply of the autonomous marine survey node 240 being below a threshold level.

The autonomous marine survey node 240 can include a location control system. The location control system can include the circuitry component 246 and the global positioning system (GPS) receiver 244. The location control system can be configured to determine an aerial location of the autonomous marine survey node 240 using the GPS receiver 244. The determined aerial location can be used to guide the autonomous marine survey node 240 from and to auxiliary station. As used herein, "auxiliary station" refers to a surface vessel configured to deploy, retrieve, or deploy and retrieve autonomous marine survey nodes. An auxiliary station can be self-propelled or towed by another surface vessel. In at least one embodiment of the present disclosure, the auxiliary station can be autonomous. As used herein, "autonomous auxiliary station" refers to an auxiliary station configured to autonomously navigate and deploy, retrieve, or deploy and retrieve autonomous marine survey nodes without human intervention. The autonomous marine survey node 240 can transmit the determined aerial location, via the EM transceiver of the circuitry component 246, to other autonomous marine survey nodes 240 to avoid midair collisions. The autonomous marine survey node 240 can transmit the determined aerial location, via the EM transceiver of the circuitry component 246, to a surface vessel. As described in association with FIG. 4, an autonomous auxiliary station, for example, can navigate to a rendezvous location at which the autonomous marine survey node 240 can land on the auxiliary station. The rendezvous location can be based on the determined aerial location.

The circuitry component 246 can be configured to use the GPS receiver 244 to determine a position of the autonomous marine survey node 240 relative to a set of deployment coordinates on an underwater surface. As described herein in association with FIGS. 3A-4, the autonomous marine survey node 240 can be configured to take off and land on an auxiliary station, such as an autonomous auxiliary station.

The location control system can include an acoustic transceiver 242. Although FIGS. 2A-2B illustrate the acoustic transceiver 242 located on the top of the autonomous marine survey node 240, embodiments of the present disclosure are not so limited. The acoustic transceiver 242 can be configured to communicate with other vessels and other marine survey nodes. The location control system can be configured to determine a submerged position of the autonomous marine survey node 240 relative to another autonomous marine survey node 240 or an auxiliary station using the acoustic transceiver 242. The acoustic transceiver 242 can function analogously to an ultra-short baseline (USBL) system or an inverted USBL (iUSBL) system. The term "USBL system" is used herein to generically cover both USBL and iUSBL systems. A typical USBL system can include an acoustic transceiver mounted on the marine survey vessel 118 described in association with FIG. 1, such as on a pole under the marine survey vessel 118, and a transponder or responder on other equipment. The USBL system can include processing resources and memory resources configured to calculate the position of the source equipment from the ranges and bearing measured by the acoustic transceivers in the USBL system. The acoustic transceivers can emit acoustic pulses that are detected by the transponders or responders, which can reply with their own acoustic pulse. The acoustic transceiver can detect the return pulse. The time from transmission of the initial acoustic pulse until the reply can be detected and measured by the USBL system and converted into a range. The USBL system can also calculate an angle from the acoustic transceiver to the transponder or responder using, for example, phase differencing from an array of transducers in the transceiver.

Figure 3A:
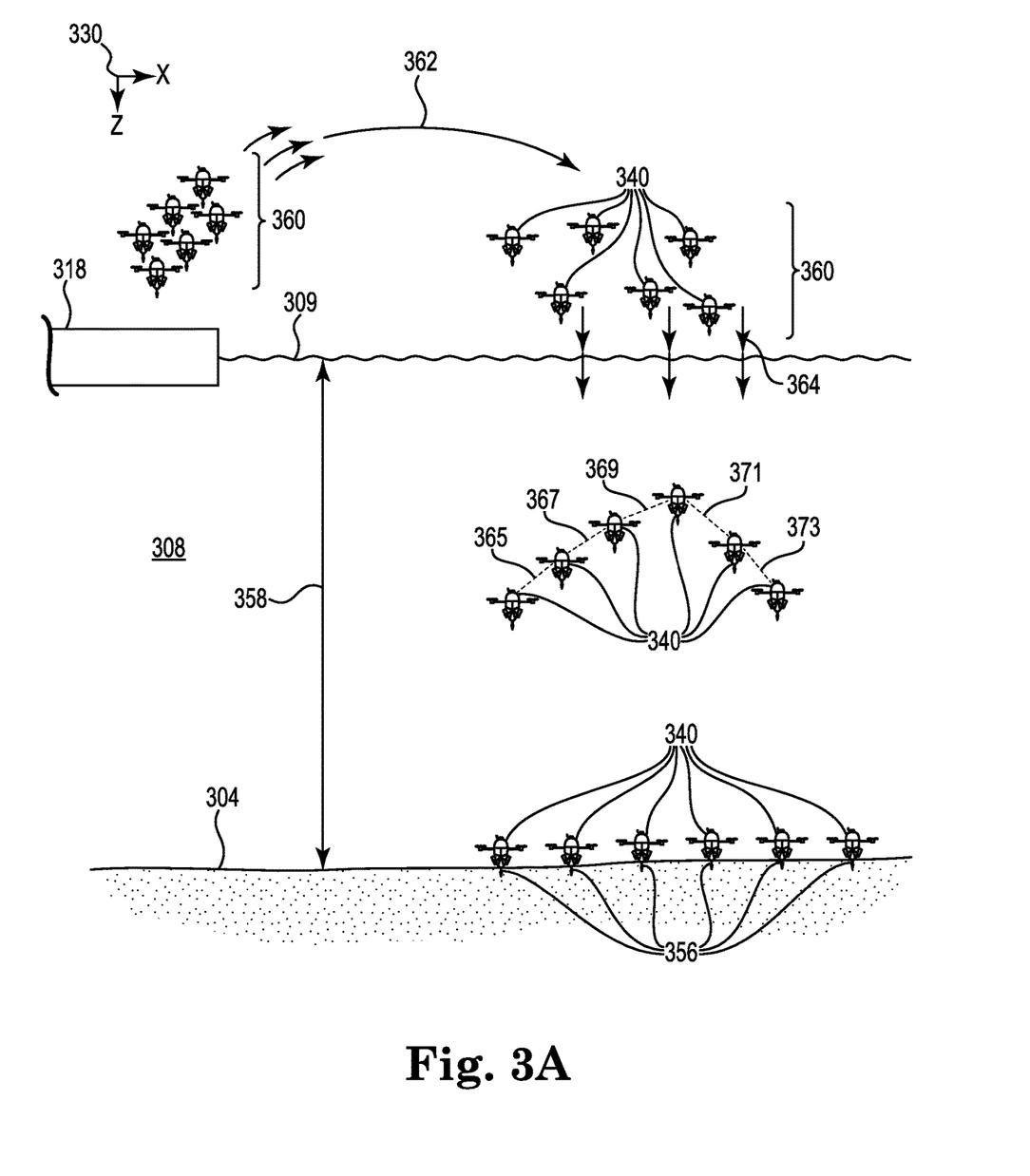
FIG. 3A is an elevation or xz-plane view of an exemplary embodiment of deployment of autonomous marine survey nodes.
Figure 3B:
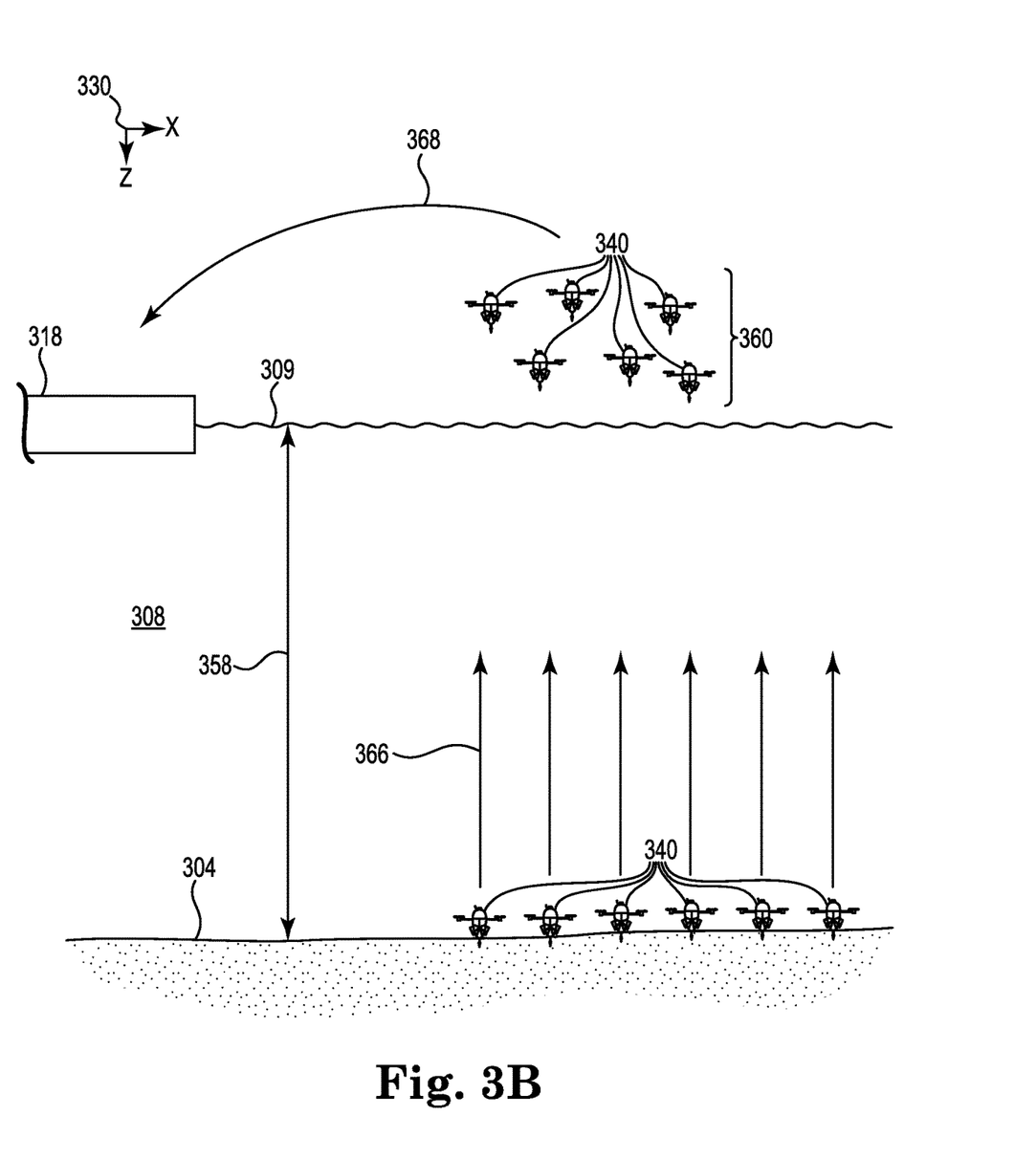
FIG. 3B is an elevation or xz-plane view of the exemplary embodiment of retrieval of autonomous marine survey nodes shown in FIG. 3A.

As described in association with FIGS. 3A-3B, the location control system can be configured to use the acoustic transceiver 242 to determine a position of the autonomous marine survey node 240 relative to another autonomous marine survey node 240 to precisely deploy the autonomous marine survey node 240 onto an underwater surface relative to a different autonomous marine survey node 240 deployed onto the underwater surface. The location control system can use the acoustic transceiver 242 to determine a position of the autonomous marine survey node 240 relative to an auxiliary station to facilitate landing of the autonomous marine survey node 240 on the auxiliary station. However, embodiments of the present disclosure are not limited to using the acoustic transceiver 242 to determine a position of the autonomous marine survey node 240. Although not specifically illustrated, the location control system can use EM communication to determine the position of the autonomous marine survey node 240 relative to another autonomous marine survey node 240. The location control system can use combinations of techniques for determining location. For example, the location control system of the autonomous marine survey node 240 can use the GPS receiver 244 and dead reckoning and a location of another autonomous marine survey node 240 to determine a position of the autonomous marine survey node 240 relative to the other autonomous marine survey node 240. The location of the other autonomous marine survey node 240 can be received from the other autonomous marine survey node 240 via the communication transceiver of the autonomous marine survey node 240. The location control system can be configured to determine a location at which to anchor to the underwater surface based on a characteristic of the marine survey node array according to a marine survey plan and the determined position of the autonomous marine survey node relative to another autonomous marine survey node.

FIG. 3A is an elevation or xz-plane 330 view of an exemplary embodiment of deployment of autonomous marine survey nodes 340. As illustrated in FIG. 3A, a plurality of the autonomous marine survey nodes 340 can be deployed as a swarm 360. Although FIGS. 3A-3B show the swarm 360 including six of the autonomous marine survey nodes 340, embodiments of the present disclosure are not so limited. The swarm 360 can include fewer or greater than six of the autonomous marine survey nodes 340. For example, the swarm 360 can include five to one hundred of the autonomous marine survey nodes 340. Although FIGS. 3A-3B show a single swarm 360, multiple swarms 360 can be used to perform a marine survey. The multiple swarms 360 can take off from and land onto one or more surface vessels as described herein.

Figure 4:
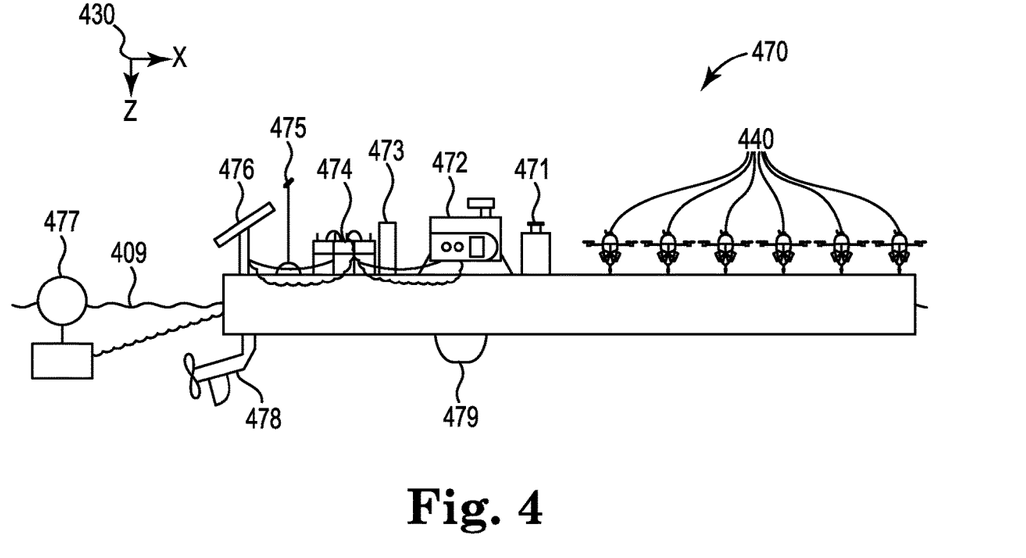
FIG. 4 is an elevation or xz-plane view of an exemplary embodiment of an autonomous auxiliary station for deployment and retrieval of autonomous marine survey nodes.

The swarm 360 can takeoff from a surface vessel, such as the marine survey vessel 318, or an auxiliary station, such as the autonomous auxiliary station 470 described in association with FIG. 4. The autonomous marine survey nodes 340 of the swarm 360 can be configured to takeoff individually (a first one of the autonomous marine survey nodes 340 takes off, then a second one of the autonomous marine survey nodes 340 takes off, and so on) or collectively as the swarm 360. The swarm 360 can maneuver from the marine survey vessel 318 to a set of coordinates (for example, GPS coordinates) on the water surface 309 (hereinafter referred to as a set of water surface coordinates). The set of water surface coordinates can indicate individual locations at which each autonomous marine survey node 340 of the swarm 360 is to submerge into the fluid volume 308. The set of water surface coordinates can indicate a location at which the swarm 360 is to submerge into the fluid volume 308. The swarm can maneuver to a set of water surface coordinates via aerial flights as indicated by the arrow 362. A marine survey plan can include a set of coordinates on an underwater surface, such as the underwater surface 304, (hereinafter referred to as a set of underwater surface coordinates) for a marine survey node array, a set of water surface coordinates, characteristics of a marine survey node array, and a survey route, for example. As used herein, "survey route" refers to a planned route of a marine survey vessel towing a source.

A marine survey plan can include a set of water surface coordinates to reduce the distance that an autonomous marine survey node 340 maneuvers from the water surface 309 to a location on the underwater surface 304 at which the autonomous marine survey node 340 is to collect marine survey data. An autonomous marine survey node 340 may encounter increased resistance when maneuvering submerged in the fluid volume 308 than when maneuvering in the air. Thus, an autonomous marine survey node 340 may expend more resources and undergo increased wear and tear when submerged than when airborne. As such, reducing the distance an autonomous marine survey node 340 has to maneuver when submerged can reduce resource expenditure and wear and tear of the autonomous marine survey node 340.

Depending on the survey route, at a moment of time during a marine survey, some marine survey nodes, such as the autonomous marine survey nodes 340, of a marine survey node array may be too far away from the source to collect marine survey data. Some marine survey nodes of a marine survey node array can be deployed onto the underwater surface before other marine survey nodes of the marine survey node array are deployed based on the survey route. For example, if a marine survey vessel is sailing from north to south, then marine survey nodes at the north end of a marine survey node array can collect marine survey data before marine survey nodes at the south end of the marine survey node array. Thus, the marine survey nodes at the north end of the marine survey node array can be deployed onto the underwater surface before the marine survey nodes at the south end of the marine survey node array. The marine survey nodes at the north end of the marine survey node array can be retrieved from the underwater surface before the marine survey nodes at the south end of the marine survey node array. In at least one embodiment, the marine survey nodes at the north end of the marine survey node array can be redeployed (either from a surface vessel or directly from the underwater surface 304 without surfacing) to a more southern location along the marine survey route after collecting marine survey data at the north end. For example, after a marine survey vessel passes autonomous marine survey nodes 340 positioned on the underwater surface 304 near a more northern location along a marine survey route, the autonomous marine survey nodes 340 can surface, fly past the marine survey vessel, and position themselves onto the underwater surface 304 at a more southern location along the marine survey route prior to the marine survey vessel reaching the more southern location along the marine survey route.

As illustrated in FIG. 3A, when the swarm 360 reaches the set of water surface coordinates, the marine survey nodes 340 of the swarm can descend and submerge into the fluid volume 308 as indicated by the arrows 364. To descend, the ballast tanks of the autonomous marine survey nodes 340 can be filled with water from the surrounding environment of the autonomous marine survey nodes 340, for example. In at least one embodiment of the present disclosure, the maneuvering systems of the autonomous marine survey nodes 340 can transition from a first operating mode for aerial maneuvers to a second operating mode for submerged maneuvers upon the autonomous marine survey nodes 340 reaching the water surface 309 or submerging. For example, rotors of the autonomous marine survey nodes 340 can transition from a first orientation to a second orientation as described in association with FIGS. 2A-2B.

Once submerged, the autonomous marine survey nodes 340 of the swarm 360 can maneuver relative to one another to form a marine survey node array according to a marine survey plan. The autonomous marine survey nodes 340 can communicate directly with one another to determine their respective relative positions as represented by the dashed lines 365, 367, 369, 371, and 373. As used herein, "communicate directly" refers to an autonomous marine survey node transmitting information directly to or receiving information directly from another autonomous marine survey node without transmitting the information to or receiving the information from an intermediary device, such as a surface vessel. The autonomous marine survey nodes 340 can communicate directly with other autonomous marine survey nodes 340 of the swarm 360 to form a marine survey node array on the underwater surface 304. The autonomous marine survey nodes 340 can communicate acoustically with one another. As the autonomous marine survey nodes 340 descend towards the underwater surface 304, the autonomous marine survey nodes 340 can maneuver relative to one another to be positioned away from one another according to a marine survey plan. For example, if a row or column of the marine survey node array includes marine survey nodes spaced apart from one another by one hundred and fifty meters, then the autonomous marine survey nodes 340 can maneuver themselves to be one hundred and fifty meters apart. However, embodiments of the present disclosure are not limited to a spacing of one hundred and fifty meters. For example, the autonomous marine survey nodes 340 can maneuver themselves to be five meters to two hundred meters apart depending on a marine survey plan. The autonomous marine survey nodes 340 of the swarm 360 can cooperate to operate as a collective unit to form a marine survey node array and collect marine survey data near the underwater surface 304.

The autonomous marine survey nodes 340 can maneuver all the way from the water surface 309 to the underwater surface 304. The underwater surface 304 can be at a depth (indicated by the arrow 358) of three to three thousand meters relative to the water surface 309. In response to reaching the set of underwater surface coordinates, the autonomous marine survey nodes 340 can deploy onto the underwater surface 304. For example, the anchoring systems 356 of the autonomous marine survey nodes 340 can be engaged to secure the autonomous marine survey nodes 340 to the underwater surface 304.

FIG. 3B illustrates an elevation or xz-plane 330 view of retrieval of the autonomous marine survey nodes 340. The autonomous marine survey nodes 340 can maneuver from the underwater surface 304 to the water surface 309 as indicated by the arrows 366. For example, subsequent to collecting marine survey data with any one of the autonomous marine survey nodes 340, an autonomous marine survey node can ascend from the underwater surface 304 to the water surface 309. In at least one embodiment of the present disclosure, any one of the autonomous marine survey nodes 340 can be configured to maneuver to the water surface 309 in response to a memory of the autonomous marine survey node storing at least a threshold amount of data (for example, collected marine survey data), an energy level of a power supply of the autonomous marine survey node being at or below a threshold energy level, or completion of at least a portion of a marine survey. In at least one embodiment of the present disclosure, a different autonomous marine survey node (not shown in FIGS. 3A-3B) can submerge from the water surface 309 and communicate with the autonomous marine survey nodes 340 to provide instructions to the autonomous marine survey nodes 340 already submerged or positioned on the underwater surface 304. This autonomous marine survey node can be referred to as a messenger node. For example, a messenger node can provide instructions to the autonomous marine survey nodes 340 to return to the marine survey vessel 318. A messenger node can provide updated instructions to the autonomous marine survey nodes 340, such as updated coordinates of a rendezvous location, survey dates, and survey links.

The anchoring system 356 of the autonomous marine survey nodes 340 can be disengaged to release the autonomous marine survey nodes 340 from the underwater surface 304. To ascend to the water surface, the ballast tanks of the autonomous marine survey nodes 340 can be evacuated of liquid. For example, a gas can be injected into the ballast tank to evacuate the liquid. In at least one embodiment of the present disclosure, upon reaching the water surface 309, the maneuvering systems of the autonomous marine survey nodes 340 can transition from the second operating mode for submerged maneuvers to the first operating mode for aerial maneuvers in response to the autonomous marine survey nodes 340 approaching or reaching the water surface 309. For example, the rotors of the autonomous marine survey nodes 340 can transition from the second orientation to the first orientation as described in association with FIGS. 2A-2B.

The autonomous marine survey nodes 340 can takeoff from the water surface individually or collectively as the swarm 360. Once airborne, the autonomous marine survey nodes 340 can fly to the marine survey vessel 318 as indicated by the arrow 368. Although FIG. 3B illustrates the autonomous marine survey nodes 340 returning to the same marine survey vessel 318 from which the autonomous marine survey nodes 340 were deployed, embodiments of the present disclosure are not so limited. For example, any one of the autonomous marine survey nodes 340 can takeoff from one surface vessel and return to a different surface vessel. The autonomous marine survey nodes 340 can use an onboard GPS receiver to determine the positions of the autonomous marine survey nodes 340 relative to a surface vessel (for example, the marine survey vessel 318) to which the autonomous marine survey nodes 340 are returning. The autonomous marine survey nodes 340 can use the determined position to maneuver to the marine survey vessel 318. The autonomous marine survey nodes 340 can land on the marine survey vessel 318 individually or collectively as the swarm 360.

FIG. 4 is an elevation or xz-plane 430 view of an exemplary embodiment of an autonomous auxiliary station 470 for deployment and retrieval of autonomous marine survey nodes 440. Instead of deploying from and returning to one or more marine survey vessels as described in association with FIGS. 3A-3B, in at least one embodiment of the present disclosure, the autonomous marine survey nodes 440 can deploy from and return to the autonomous auxiliary station 470. However, the autonomous marine survey nodes 440 are not limited to returning to the same autonomous auxiliary station 470 from which the autonomous marine survey nodes 440 were deployed. The autonomous auxiliary station 470 can be transported onboard a surface vessel (for example, the marine survey vessel 118 described in association with FIG. 1) and deployed from the marine survey vessel. For example, when a marine survey vessel approaches a site for a marine survey, the autonomous auxiliary station 470 can be deployed from the marine survey vessel.

As illustrated in FIG. 4, the autonomous auxiliary station 470 is a surface vessel with various equipment and systems installed thereon for navigation, power, data storage, and data processing, for example. As illustrated in FIG. 4, the autonomous auxiliary station 470 is a flat-bottomed surface vessel, such as a barge or platform. However, embodiments of the present disclosure are not limited to the autonomous auxiliary station 470 being flat-bottomed. For example, the autonomous auxiliary station 470 can be a non-flat-bottom surface vessel, such as a boat, with various equipment and systems installed thereon. The autonomous auxiliary station 470 can be configured to recharge a power supply of any one of the autonomous marine survey nodes 440 onboard the autonomous auxiliary station 470. For example, the autonomous auxiliary station 470 can be configured to recharge a power supply of an autonomous marine survey node 440 in response to the autonomous marine survey node 440 landing on the autonomous auxiliary station 470. A power supply of the autonomous auxiliary station 470 can include at least one of a fuel-based generator 472, one or more batteries 474, a solar collector 476, and a wave power generator 477. The autonomous auxiliary station 470 can include a fuel supply 471 coupled to the fuel-based generator 472. Although FIG. 4 illustrates the wave power generator 477 trailing behind the autonomous auxiliary station 470, embodiments of the present disclosure are not so limited. For example, the wave power generator 477 can be to a side of the autonomous auxiliary station 470.

The autonomous auxiliary station 470 can include a data processing subsystem 473. The data processing subsystem 473 can include a processing resource, such as a processor, application specific integrated circuit, microcontroller, etc. and memory. The memory can be configured to store marine survey data downloaded from one or more of the autonomous marine survey nodes 440. The data processing subsystem 473 can be configured to transfer stored marine survey data to another surface vessel or a data processing system onshore. The data processing subsystem 473 can be configured to generate an image of a subsurface formation from marine survey data downloaded from one or more autonomous marine survey nodes 473.

The autonomous auxiliary station 470 can include a propulsion subsystem 478. As illustrated in FIG. 4, the propulsion subsystem 478 can include one or more propellers. The propulsion subsystem 478 can include a thruster. The power supply can power the propulsion subsystem 260. For example, the fuel supply 471 can provide fuel to the propulsion subsystem 478 and the fuel-based generator 472 can provide electrical power to the propulsion system 478.

The autonomous auxiliary station 470 can include a location control subsystem. The location control subsystem can be configured to activate and direct the propulsion subsystem 478 to move the autonomous auxiliary station 470. For example, the location control subsystem can be configured to activate and direct movement of the propulsion subsystem 478 to navigate the autonomous auxiliary station 470 to a set of water surface coordinates at which the autonomous marine survey nodes 440 can take off from or land onto the autonomous auxiliary station 470. A marine survey plan can include a set of water surface coordinates to reduce the distance that an autonomous auxiliary station 470 navigates from a location on the water surface 409 at which the autonomous marine survey nodes 440 takeoff from the autonomous auxiliary station 470 to a different location on the water surface 409 at which the autonomous marine survey nodes 440 land onto the autonomous auxiliary station 470. Rather than navigating to multiple different locations on the water surface 409 for an individual autonomous marine survey node 440 to takeoff from or land onto the autonomous auxiliary station 470, the set of water surface coordinates can indicate a location on the water surface 409 at which multiple autonomous marine survey nodes 440 can takeoff from or land onto the autonomous auxiliary station 470. For example, a marine survey plan can include a set of water surface coordinates indicating a first location at which a swarm of the autonomous marine survey nodes 440 can takeoff from the autonomous auxiliary station 470 and a second location at which the swarm can land onto the autonomous auxiliary station 470 such that the autonomous auxiliary station 470 navigates from the first location to the second location. The first location can be different from the second location because of underwater currents or because the autonomous auxiliary station 470 is following a marine survey vessel along a survey route. The water surface coordinates can be based on sets of underwater surface coordinates indicating locations on an underwater surface at which the autonomous marine survey nodes 440 are to collect marine survey data to reduce the total distance, in air and submerged, that the autonomous marine survey nodes 440 maneuver from the autonomous auxiliary station 470 to an underwater surface and from an underwater surface to the autonomous auxiliary station 470. Reducing the distance that the autonomous marine survey nodes 440 maneuver can reduce resource expenditure and wear and tear of the autonomous marine survey nodes 440.

The location control subsystem can include a GPS receiver 475. The location control subsystem can include an acoustic transceiver 479. The acoustic transceiver 479 can be a part of an USBL system as described in association with FIGS. 2A-2B. The acoustic transceiver 479 can be configured to communicate with one or more of the autonomous marine survey nodes 440. For example, the autonomous auxiliary station 470 can communicate acoustically, via the acoustic transceiver 479, with one or more of the autonomous marine survey nodes 440 to determine a position of the autonomous auxiliary station 470 relative to the autonomous marine survey nodes 440.

The autonomous auxiliary station 470 can use the determined position to determine a rendezvous location to which the autonomous auxiliary station 470 can navigate and at which the autonomous marine survey nodes 440 can land on the autonomous auxiliary station 470. A rendezvous location is a location on a water surface at which one or more autonomous marine survey nodes 440 can return to a surface vessel, such as the autonomous auxiliary station 470. The rendezvous location can be set to reduce or minimize a distance that an autonomous marine survey node 440 travels from a location on the underwater surface at which the autonomous marine survey node 440 collected marine survey data to the surface vessel. The autonomous marine survey nodes 440 can land on the surface vessel at the rendezvous location to improve an efficiency of a marine survey. Reducing the distance that the autonomous marine survey nodes 440 travels reduces the travel time as well, which can reduce turnaround time for redeployment of the autonomous marine survey nodes 440. The location control subsystem can activate and direct the propulsion subsystem 478 to move the autonomous auxiliary station 470 to the determined position or the rendezvous location, for example. An autonomous marine survey node 440 can be redeployed at or near the same location on the underwater surface 404 at which the autonomous marine survey node 440, or a different type of node, was previously deployed or at a different location on the underwater surface 404 than the location on the underwater surface 404 at which the autonomous marine survey node 440 was previously deployed.

Underwater currents can cause the autonomous marine survey nodes 440 to surface at a different location other than a location directly above where the autonomous marine survey nodes 440 were deployed onto the underwater surface 404. Thus, it can be beneficial for the autonomous auxiliary station 470 to navigate to a rendezvous location near where the autonomous marine survey nodes will surface.

The autonomous auxiliary station 470 can be configured to transfer data from any one of the autonomous marine survey nodes 440 onboard the autonomous auxiliary station 470 to the data processing subsystem 471. The data can include diagnostic data from an autonomous marine survey node 440 onboard the autonomous auxiliary station 470. The diagnostic data can include an energy level of a power supply of any one of the autonomous marine survey nodes 440, status of a maneuvering system of any one of the autonomous marine survey nodes 440, and other status information or error messages regarding systems of any one of the autonomous marine survey nodes 440. The autonomous auxiliary station 470 can be configured to transfer instructions for forming a marine survey node array to any one of the autonomous marine survey nodes 440 onboard the autonomous auxiliary station 470.

Figure 5:
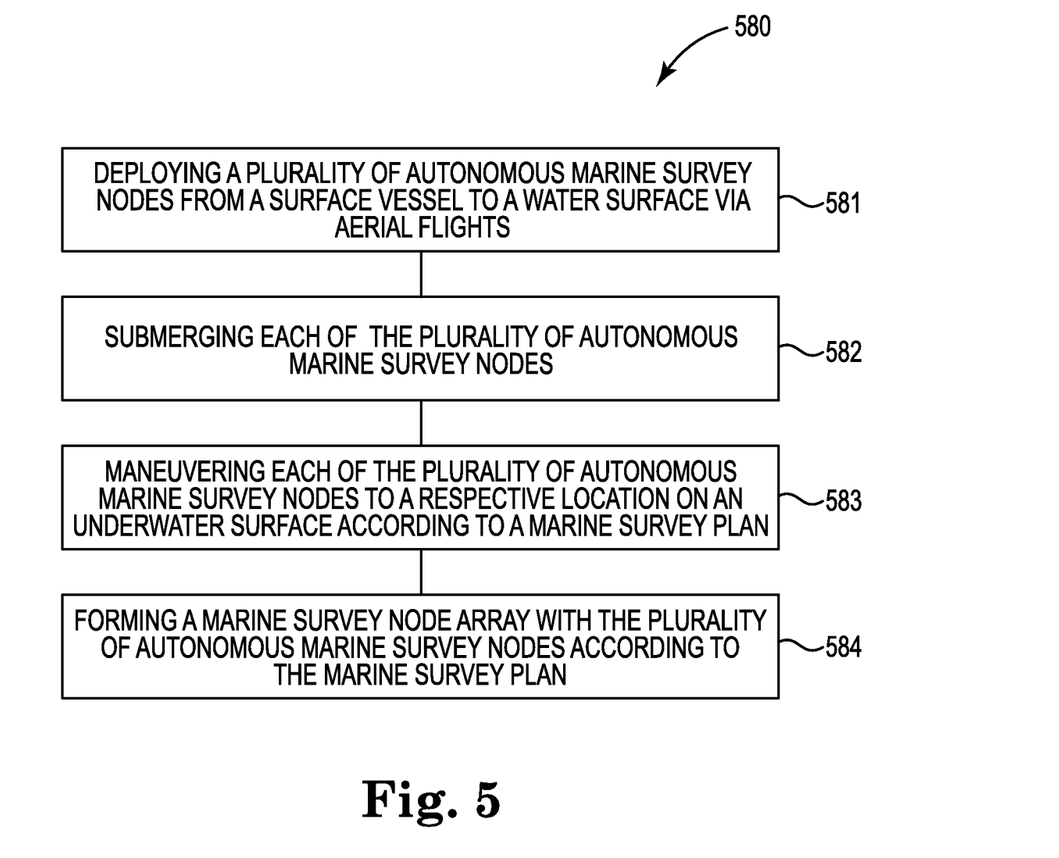
FIG. 5 illustrates an exemplary embodiment of a method for deployment of autonomous marine survey nodes.

FIG. 5 is an exemplary embodiment of a method 580 for deployment of autonomous marine survey nodes. At 581, the method 580 can include deploying a plurality of autonomous marine survey nodes from a surface vessel to a water surface via aerial flights. At 582, the method 580 can include submerging each of the plurality of autonomous marine survey nodes. At 583, the method 580 can include maneuvering each of the plurality of autonomous marine survey nodes to a respective location on an underwater surface according to a marine survey plan. At 584, the method 580 can include forming a marine survey node array with the plurality of autonomous marine survey nodes according to the marine survey plan.

Although not illustrated in FIG. 5, in at least one embodiment, the method 580 can include collecting marine survey data with the marine survey node array, maneuvering each of the plurality of autonomous marine survey nodes to the water surface, and returning each of the plurality of autonomous marine survey nodes from the water surface to the surface vessel via aerial flights. Collecting marine survey data with the marine survey node can include positioning the autonomous marine survey nodes onto the underwater surface as described herein, actuating a source towed by a marine survey vessel near the positioned autonomous marine survey nodes, and collecting, with the positioned autonomous marine survey nodes, reflected energy originating from the actuation of the source. The method 580 can include anchoring the plurality of autonomous marine survey nodes to the underwater surface to collect the marine survey data. The collected marine survey data can be downloaded from at least one of the plurality of autonomous marine survey nodes.

Although not illustrated in FIG. 5, in at least one embodiment, the method 580 can include autonomously redeploying at least one of the plurality of autonomous marine survey nodes from the surface vessel to the water surface via an aerial flight, submerging the redeployed autonomous marine survey node, and maneuvering the redeployed autonomous marine survey node from the water surface to the underwater surface according to the marine survey plan. Maneuvering the redeployed autonomous marine survey node to the underwater surface can include maneuvering the redeployed autonomous marine survey node to or near the respective location on the underwater surface. Maneuvering the redeployed autonomous marine survey node to the underwater surface can include maneuvering the redeployed autonomous marine survey node to a different location on the underwater surface than the respective location. The method 580 can include returning the redeployed autonomous marine survey node from the underwater surface to the water surface and returning the redeployed autonomous marine survey node from the water surface to the surface vessel via an aerial flight.

Although not illustrated in FIG. 5, in at least one embodiment, the method 580 can include autonomously navigating the surface vessel according to the marine survey plan. In at least one embodiment, autonomously navigating the surface vessel can include autonomously determining a deployment location for the plurality of autonomous marine survey nodes based on the marine survey plan and autonomously navigating the surface vessel to the deployment location. A deployment location is a location on a water surface at which to deploy one or autonomous marine survey nodes from a surface vessel to reduce a distance that an autonomous marine survey node travels from the surface vessel to a location on an underwater surface at which one of the autonomous marine survey nodes is to collect marine survey data. The deployment location can be determined based on a marine survey plan and a location of a marine survey vessel towing a source along a marine survey route. The autonomous marine survey nodes can takeoff from the surface vessel at the deployment location to improve an efficiency of a marine survey. Reducing the distance that the autonomous marine survey nodes travels reduces the travel time as well without affecting the precision of placement of the autonomous survey nodes on the underwater surface. As described herein, the autonomous marine survey nodes can determine respective positions relative to one another for precise placement on the underwater surface. Autonomously deploying the plurality of autonomous marine survey nodes can include autonomously deploying the plurality of autonomous marine survey nodes at the deployment location. For example, a location control subsystem of an autonomous auxiliary station can activate and direct a propulsion subsystem of the autonomous auxiliary station to move the autonomous auxiliary station to the deployment location.

In at least one embodiment, autonomously navigating the surface vessel can include autonomously determining a rendezvous location for the plurality of autonomous marine survey nodes and the surface vessel based on the marine survey plan and a position of any one of the plurality of autonomous marine survey nodes and autonomously navigating the surface vessel to the rendezvous location. The method 580 can include returning the plurality of autonomous marine survey nodes to the surface vessel at the rendezvous location.

Although not illustrated in FIG. 5, in at least one embodiment, the method 580 can include autonomously recharging any one of the plurality of autonomous marine survey nodes upon the autonomous marine survey node returning to the surface vessel. In at least one embodiment, the method 580 can include transferring a set of water surface coordinates and a set of underwater surface coordinates associated with the marine survey plan to any one of the plurality of autonomous marine survey nodes, redeploying at least one of the plurality of autonomous marine survey nodes from the surface vessel to the set of water surface coordinates via an aerial flight, and maneuvering the redeployed autonomous marine survey node to the set of underwater surface coordinates. In at least one embodiment, the method 580 can include maneuvering the plurality of redeployed autonomous marine survey nodes at a range of depths of three to three thousand meters. In at least one embodiment, the method 580 can include directly communicating between the plurality of autonomous marine survey nodes to determine respective positions of the plurality of autonomous marine survey nodes relative to one another. Directly communicating between the plurality of autonomous marine survey nodes can include acoustically communicating between the plurality of autonomous marine survey nodes.

In at least one embodiment, the method 580 can include downloading diagnostic data, collected marine survey data, or combinations thereof from any one of the plurality of autonomous marine survey nodes.

Figure 6:
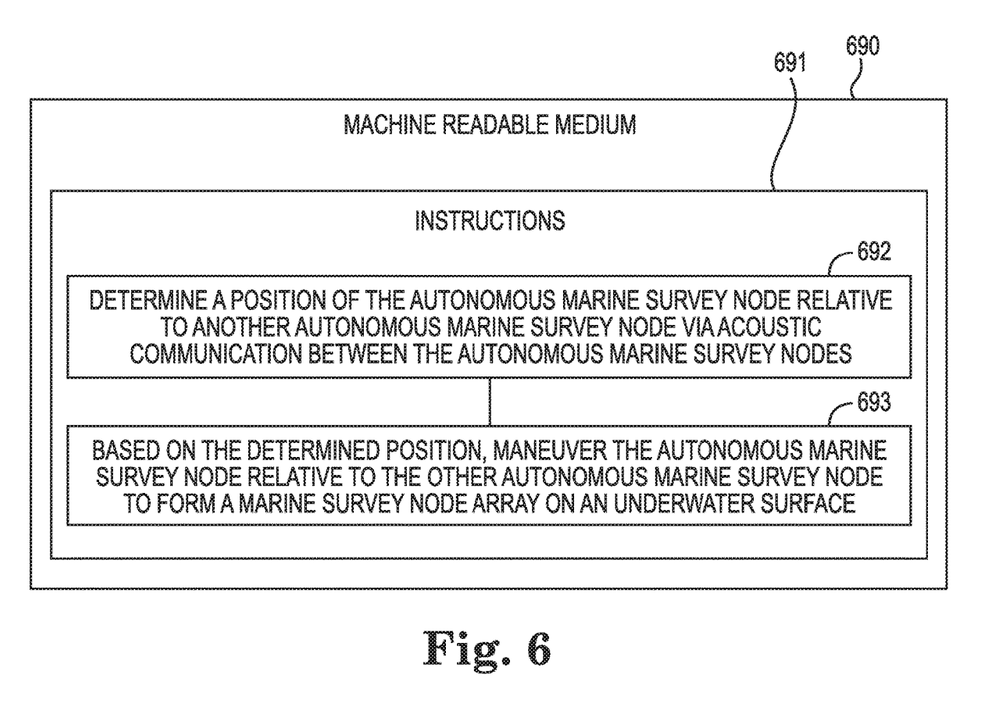
FIG. 6 illustrates an exemplary embodiment of a machine-readable medium for deployment of autonomous marine survey nodes.

FIG. 6 is an exemplary embodiment of a machine-readable medium 690 for deployment of autonomous marine survey nodes. The machine-readable medium 690 can store instructions 691, such as machine-readable instructions. The instructions 691 can be program instructions executable to implement a particular function. For example, the instructions 691 can be executable by a processing resource onboard an autonomous marine survey node to determine a position of the autonomous marine survey node relative to another autonomous marine survey node via acoustic communication between the autonomous marine survey nodes as shown at block 692.

The instructions 691 can be executed to, based on the determined position, maneuver the autonomous marine survey node relative to the other autonomous marine survey node to form a marine survey node array on an underwater surface as shown at block 693.

Although not illustrated n FIG. 6, the instructions 691 can be executed to, based on the determined position, maneuver the marine survey node array such that the autonomous marine survey node is spaced apart from the marine survey node by a particular distance in at least one dimension.

In accordance with at least one embodiment of the present disclosure, a geophysical data product may be produced or manufactured. A plurality of autonomous marine survey nodes can deploy from a surface vessel to a water surface via aerial flights. The plurality of autonomous marine survey nodes can submerge. The plurality of autonomous marine survey nodes can maneuver to an underwater surface according to a marine survey plan. The plurality of autonomous marine survey nodes can form a marine survey node array according to the marine survey plan. Marine survey data can be collected with the marine survey node array. In at least one embodiment a result of the method to manufacture, such as the collected marine survey data, can be recorded in a tangible machine-readable medium, thereby completing the manufacture of the geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An autonomous marine survey node, comprising:
   a circuitry component including circuitry of a marine survey receiver;
   a ballast tank coupled to the circuitry component and configured to adjust a buoyancy of the autonomous marine survey node;
   a maneuvering system coupled to the circuitry component and configured to:
      autonomously perform aerial maneuvers when the autonomous marine survey node is airborne; and
      autonomously perform submersed maneuvers when the autonomous marine survey node is submerged in a body of water; and
   a location control system configured to:
      determine a position of the autonomous marine survey node relative to another autonomous marine survey node via acoustic communication when the autonomous marine survey node is submerged in the body of water and before it comes to rest on an underwater surface; and
      maneuver the autonomous marine survey node relative to the other autonomous marine survey node to establish a set spacing from the other node as the nodes descend in the body of water toward the underwater surface, such that the nodes form a marine survey node array exhibiting the set spacing when they come to rest on the underwater surface.

2. The autonomous marine survey node of claim 1:
   wherein the set spacing comprises a first set spacing in an x direction and a second set spacing in a y direction; and
   wherein the x direction and the y direction are both orthogonal to a depth direction.

3. The autonomous marine survey node of claim 1, wherein the ballast tank comprises a composite material and a plurality of structural support members providing an operating depth of three thousand meters.

4. The autonomous marine survey node of claim 1, wherein the maneuvering system comprises a plurality of rotors configured to:
   operate in a first orientation during aerial maneuvers; and
   operate in a second orientation during submersed maneuvers.

5. The autonomous marine survey node of claim 4, wherein the maneuvering system is configured to perform submersed maneuvers at an operating depth of three thousand meters.

6. The autonomous marine survey node of claim 1:
   further comprising an anchoring system configured to secure the autonomous marine survey node to the underwater surface; and
   wherein the anchoring system is further configured to release the autonomous marine survey node from the underwater surface in response to a sensed condition in the autonomous marine survey node.

7. The autonomous marine survey node of claim 6:
   wherein the sensed condition comprises a data storage system in the autonomous marine survey node being at or above a threshold level of fullness.

8. The autonomous marine survey node of claim 6:
   wherein the sensed condition comprises a power supply in the autonomous marine survey node being at or below a threshold level of power.

9. The autonomous marine survey node of claim 6:
wherein the anchoring system comprises a spike configured to be driven into the underwater surface.

10. The autonomous marine survey node of claim 9:
wherein the spike is stationary relative to the autonomous marine survey node and the anchoring system is configured to drive the spike into the underwater surface by spinning rotors on the node to urge the node toward the underwater surface.

11. The autonomous marine survey node of claim 9:
wherein the spike is configured to move relative to the autonomous marine survey node and the anchoring system is configured to drive the spike into the underwater surface by extending the spike from the node toward the underwater surface.

12. The autonomous marine survey node of claim 1:
further comprising an autonomous auxiliary station configured to deploy or retrieve the autonomous marine survey node without human intervention.

13. The autonomous marine survey node of claim 12:
wherein the autonomous auxiliary station is further configured to recharge a power supply of the autonomous marine survey node after the node has landed on the autonomous auxiliary station.

14. The autonomous marine survey node of claim 12:
wherein the autonomous auxiliary station is further configured to transfer stored marine survey data from the autonomous marine survey node after the node has landed on the autonomous auxiliary station.

* * * * *